United States Patent
Adachi et al.

(10) Patent No.: US 6,698,922 B2
(45) Date of Patent: Mar. 2, 2004

(54) TEMPERATURE SENSOR

(75) Inventors: Tomohiro Adachi, Kariya (JP); Atsushi Kurano, Kuwana (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/988,180

(22) Filed: Nov. 19, 2001

(65) Prior Publication Data

US 2002/0061049 A1 May 23, 2002

(30) Foreign Application Priority Data

Nov. 22, 2000 (JP) .................................. 2000-355933
Oct. 2, 2001 (JP) .................................. 2001-306758

(51) Int. Cl.$^7$ .............................. G01K 1/08; G01K 1/16; H01L 1/01
(52) U.S. Cl. .................. 374/208; 374/144; 374/163; 338/25; 338/28; 338/269
(58) Field of Search ............................... 374/208, 144, 374/148, 179, 163, 103, 185; 338/28, 25, 42, 14, 309, 162, 160, 270, 277, 281, 269

(56) References Cited

U.S. PATENT DOCUMENTS

| | | | | |
|---|---|---|---|---|
| 4,246,786 A | * | 1/1981 | Wiemer et al. | 73/362 AR |
| 5,743,646 A | * | 4/1998 | O'Connel et al. | 374/148 |
| 5,749,656 A | * | 5/1998 | Boehm et al. | 374/185 |
| 5,753,835 A | * | 5/1998 | Gustin | 73/866.5 |
| 5,999,081 A | | 12/1999 | Hannigan et al. | |
| 6,130,598 A | * | 10/2000 | Katsuki et al. | 338/28 |
| 6,164,819 A | * | 12/2000 | Moriwake et al. | 374/185 |
| 6,286,995 B1 | * | 9/2001 | Takahashi et al. | 374/148 |
| 6,305,841 B1 | * | 10/2001 | Fukaya et al. | 374/185 |
| 2002/0039378 A1 | * | 4/2002 | Shibayama | 374/148 |

FOREIGN PATENT DOCUMENTS

| | | | |
|---|---|---|---|
| DE | 4021997 A1 | 1/1991 | |
| EP | 0783096 A1 | 7/1997 | |
| JP | 58-28321 | 10/1979 | |
| JP | 5-336124 | 12/1993 | |
| JP | 11218449 A | * 8/1999 | G01K/7/22 |

OTHER PUBLICATIONS

Patent Abstracts of Japan, vol. 001, No. 092 (E–038), Aug. 25, 1997 & JP 52 027681 A (Hitachi Ltd).

* cited by examiner

Primary Examiner—Gail Verbitsky
(74) Attorney, Agent, or Firm—Nixon & Vanderhye PC (57) ABSTRACT

A temperature sensor according to the present invention includes a sensor body for sensing a temperature; a sheath pin core wire electrically connected to the sensor body; a connector electrically connecting between the sheath pin core wire and the lead wire; and a protection tube for containing the connector and the sheath pin core wire, and for protecting the connector and the sheath pin core wire. A connection portion between the sheath pin core wire and the lead wire is hardened by a ceramic material so that a molded portion is provided. A displacement limiting means is provided for limiting displacement of the molded portion exceeding a predetermined value in the protection tube. The present invention can sufficiently reduce the tension acting on a sheath pin core wire. Further, the present invention can provide an exhaust temperature sensor having a sufficiently low tension acting on the sheath pin core wire which can be effectively used in an internal combustion engine.

16 Claims, 11 Drawing Sheets

TEMPERATURE SENSOR

BACKGROUND OF THE INVENTION

1. Field of the Invention

The present invention relates to a temperature sensor. In particular, it relates to an exhaust temperature sensor for detecting a temperature of an exhaust gas in an internal combustion engine.

2. Description of the Related Art

A general structure of an exhaust temperature sensor includes a sheath pin core wire electrically connected to a sensor portion for sensing a temperature, and a lead wire electrically connected to the sheath pin core wire for transmitting an output of the sensor portion to a control apparatus.

In general, a diameter of the sheath pin core wire is φ0.2 to 0.5 mm and the diameter of the lead wire is φ1.0 to 2.0 mm. When a tension acts on the sheath pin core wire and the lead wire, the sheath pin having a small diameter may be easily cut off.

Accordingly, usually, in order to prevent a tension on the lead wire acting on the sheath pin core wire, the lead wire is held by a bush made of rubber, and the bush and the lead wire are held and fixed by calking the bush so as to reduce the inner diameter of the protection tube in the state which the bush is mounted in the protection tube.

Recently, however, the vibration of an exhaust pipe has become large along with increase of an output of an engine so that the tension acting on the lead wire has also become large. Accordingly, it is very difficult to sufficiently reduce the tension acting on the sheath pin core wire in the conventional art.

Further, by giving slack to the lead wire in the protection tube, the tension acting on the lead wire is prevented from acting on the sheath pin core wire. However, since a compact size is required for the exhaust temperature sensor, it is very difficult to provide slack on the lead wire. As a result, it is very difficult to sufficiently reduce the tension acting on the sheath pin core wire.

SUMMARY OF THE INVENTION

The present invention aims to sufficiently reduce the tension acting on a sheath pin core wire.

Further, the present invention aims to provide a temperature sensor having a sufficiently low tension acting on the sheath pin core wire.

In accordance with an aspect of the present invention, there is provided a temperature sensor including: a sensor body for sensing a temperature; a sheath pin core wire electrically connected to the sensor body; a connector electrically connecting between the sheath pin core wire and the lead wire; and a protection tube for containing the connector and the sheath pin core wire, and for protecting the connector and the sheath pin core wire; wherein a connection portion between the sheath pin core wire and the lead wire, including the connector, is hardened by a ceramic material so that a molded portion is provided; and wherein a displacement limiting means is provided for limiting the displacement of the molded portion, exceeding a predetermined value in the protection tube.

In accordance with another aspect of the present invention, there is provided a temperature sensor including: a sensor body for sensing a temperature; a sheath pin core wire electrically connected to the sensor body; a connector electrically connecting between the sheath pin core wire and the lead wire; a protection tube for containing the connector and the sheath pin core wire, and for protecting the connector and the sheath pin core wire; and a bush for holding and fastening the lead wire for the protection tube by holding the lead wire; wherein a connection portion between the sheath pin core wire and the lead wire, including the connector, is covered by a tube, and the tube is fixed to the lead wire.

In accordance with still another aspect of the present invention, there is provided a temperature sensor including: a sensor body for sensing a temperature; a sheath pin core wire electrically connected to the sensor body; a connector electrically connecting between the sheath pin core wire and the lead wire; a protection tube for containing the connector and the sheath pin core wire, and for protecting the connector and the sheath pin core wire; and a bush for holding and fastening the lead wire for the protection tube by holding the lead wire; wherein the bush is made of metal and the lead wire is held by the bush by calking the bush so as to reduce a cross-sectional area of the bush.

In accordance with still another aspect of the present invention, there is provided a temperature sensor including: a sensor body for sensing a temperature; a sheath pin core wire electrically connected to the sensor body; a metal connector electrically connecting between the sheath pin core wire and the lead wire; a protection tube for containing the connector and the sheath pin core wire, and for protecting the connector and the sheath pin core wire; and a bush for holding and fastening the lead wire for the protection tube by holding the lead wire; wherein a stopper is provided for limiting displacement of the connector due to collision of the connector exceeding a predetermined value within the protection tube.

In accordance with still another aspect of the present invention; there is provided a temperature sensor including: a sensor body for sensing a temperature; a sheath pin core wire electrically connected to the sensor body; a cylindrical sheath pin for covering the sheath pin core wire; a connector electrically connecting between the sheath pin core wire and the lead wire; and a protection tube for containing the connector and the sheath pin core wire, and for protecting the connector and the sheath pin core wire; wherein a bridge member is provided, one end of the bridge member is fixed to the lead wire, and the other end of the bridge member is fixed to the sheath pin.

In accordance with still another aspect of the present invention; there is provided a temperature sensor including: a sensor body for sensing a temperature; a sheath pin core wire electrically connected to the sensor body; a cylindrical sheath pin for covering the sheath pin core wire; a relay sheath pin core wire electrically connecting between the sheath pin core wire and the lead wire; and a cylindrical sheath pin for containing the relay sheath pin core wire in the fixed shape.

In accordance with still another aspect of the present invention; there is provided a temperature sensor including: a sensor body for sensing a temperature; a sheath pin core wire electrically connected to the sensor body; a metal connector for electrically connecting between the sheath pin core wire and the lead wire; and a protection tube for containing the connector and the sheath pin core wire, and for protecting the connector and the sheath pin core wire; wherein a stopper is provided for limiting displacement of the connector exceeding a predetermined value due to collision of the connector within the protection tube, the stopper includes a cylindrical portion for covering the connector; and the cylindrical portion covers portions of the connector except for a connecting portion of the sheath pin core wire.

DESCRIPTION OF THE PREFERRED EMBODIMENTS

The preferred embodiments of the present invention will be explained in detail, with reference to the drawings, below.
(First Embodiment)

Figure 1:
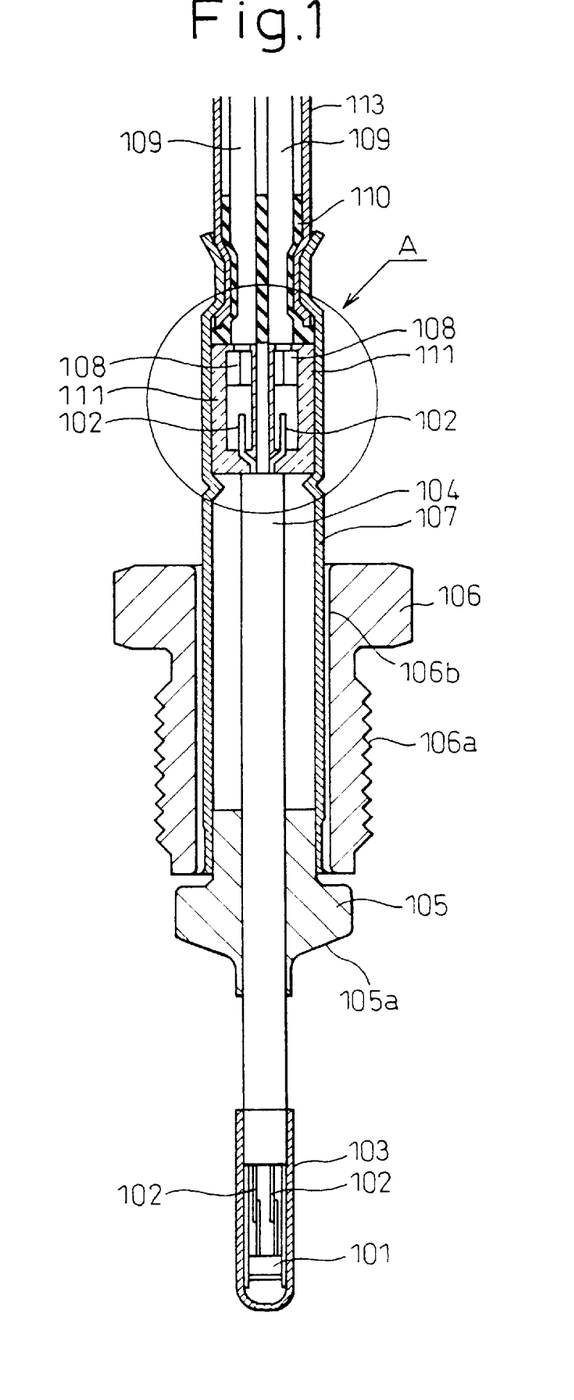
FIG. 1 is a cross-sectional view of an exhaust temperature sensor according to an embodiment of the present invention.
Figure 2:
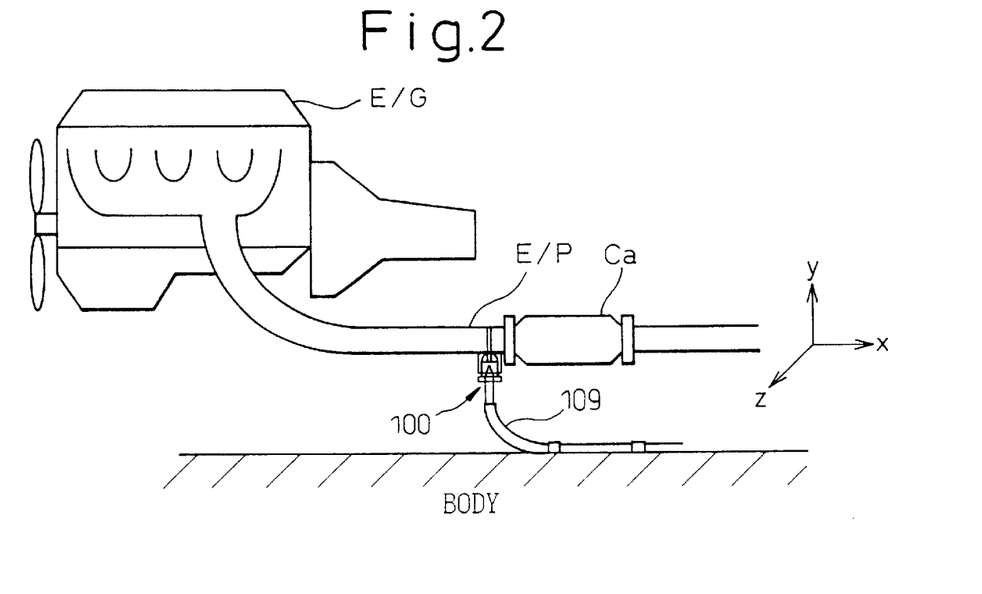
FIG. 2 is a schematic of an engine exhaust system using the temperature sensor shown in FIG. 1.
Figure 3:
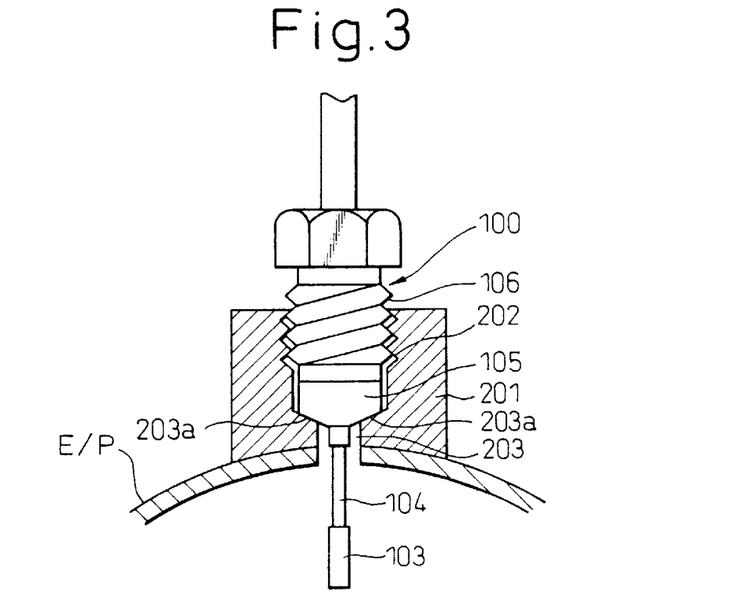
FIG. 3 is a view for explaining a mounting structure of the temperature sensor shown in FIG. 1.
Figure 4:
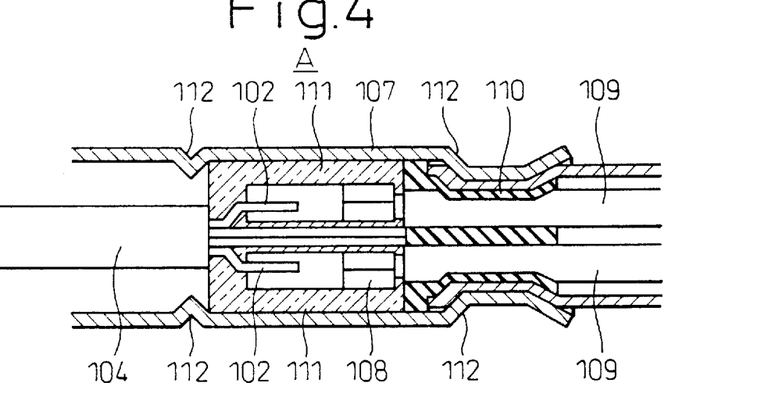
FIG. 4 is an enlarged view of the portion A shown in FIG. 1, and used as a first embodiment.

FIG. 1 is a cross-sectional view of an exhaust temperature sensor according to an embodiment of the present invention. FIG. 2 is a schematic of an engine exhaust system using the temperature sensor shown in FIG. 1. FIG. 3 is a view for explaining a mounting structure of the temperature sensor shown in FIG. 1. FIG. 4 is an enlarged view of the portion A shown in FIG. 1, and is used as a first embodiment.

A temperature sensor of this embodiment is applied to an exhaust temperature sensor 100 for detecting temperature of the gas exhausted from an engine for a vehicle (i.e., an internal combustion engine). As shown in FIG. 2, the temperature sensor 100 is mounted in the vicinity of a catalytic converter rhodium (CCRO) Ca in an exhaust pipe E/P connected to an engine E/G. In detail, temperature sensor 100 is located to the upstream side of the catalytic converter rhodium Ca.

In FIG. 3, the temperature sensor 100 is mounted to the exhaust pipe E/P as shown in the drawing. Number 201 is a boss portion (i.e., a mounting base), to mount the temperature sensor 100, welded to the exhausted pipe E/P. The boss portion 201 has a penetrating hole 203, which further penetrates the exhaust pipe 200. The penetrating hole 203 is utilized as a previously opened hole in order to form a female screw 202.

On the other hand, in FIG. 1, number 101 is a sensor body such as a thermistor, for sensing an exhaust temperature, by putting it into exhaust gas flowing in the exhaust pipe 200. Number 102 is a sheath pin core wire electrically connected to the sensor body 101. Number 103 is a sensor cover for covering the sensor body 101 and is made of stainless steel. Number 104 is a sheath pin formed cylindrically, for covering a sheath pin core wire 102, and is made of stainless steel.

Further, number 105 is a rib (sealing member) made of stainless steel and contacts a taper portion 203a (see FIG. 3) of the penetrating hole (a previous-opened hole) 203. Further, the rib 105 has a taper portion 105a, which is cylindrically formed in order to prevent leakage of the exhaust gas from the penetrating hole 203 in which the temperature sensor 100 is inserted. The rib 105 is coupled to the sheath pin 104 by soldering or welding thereto.

Further, number 106 is a nipple nut which includes a male screw 106a which screw-couples to the female screw 202 of the boss portion 201. Further, the nipple nut 106 includes an insertion hole 106b in which a protection tube 107 is inserted. The protection tube 107 is made of stainless steel, and is formed cylindrically in order to cover the sheath pin 104.

In this case, the protection tube 107 is coupled to the rib 105 by soldering or welding thereto. The nipple nut 106 can slide on the protection tube 107 in the longitudinal direction.

When mounting the temperature sensor 100 to the boss portion 201 (an exhaust pipe 200), in the situation which contacts the taper portion 105a of the rib 105 to the taper portion 203a of the penetrating hole 203, the nipple nut 106 is screwed to the boss portion 201, and the exhaust temperature sensor 100 is fixed to the boss portion 201 (an exhaust pipe 200) by pushing the taper portion 105a to the taper portion 203a based on a coupling force (a fastening force).

Further, number 108 is a connector made of metal and electrically connected between a lead wire 109 and a sheath pin core wire 102. The lead wire 109 and the connector 108 are fastened tightly with a mechanical method. On the other hand, the connector 108 and the sheath pin core 102 are welded tightly by a resistance welding method.

Further, number 110 is a bush for holding and fastening the lead wire 109 and is made of a resin or rubber. The bush 110 is fixed into the protection tube 107 by giving plastic deformation to the protection tube 107 in the direction so as to reduce an inner diameter thereof. In this case, number 113 is a protection tube for protecting the lead wire 109 and made of a resin.

Further, as shown in FIG. 4, a portion A connecting between the sheath pin core wire 102 and the lead wire 109, and including the connector 108, is fastened (molded) by a ceramic (for example, glass in this embodiment) having high heat-proof characteristic exceeding a predetermined temperature. Number 112 is a stopper (a displacement limiting means) for limiting displacement of a molded member 111, exceeding a predetermined amount, in the protection tube 107.

In this embodiment, the stopper 112 is formed by giving the plastic deformation to the protection tube 107 in the direction of an inner diameter of the protection tube 107. Accordingly, the stopper 112 has an annular portion projected in the direction of the inner diameter of the protection tube 107.

Next, the feature of this embodiment will be explained below.

According to this embodiment, the connection portion A between the sheath pin core wire 102 including the connector 108 and the lead wire 109 is fixed by using glass (sealed by glass). The displacement of the molded portion 111 is limited by the stopper 112. Accordingly, it is possible to receive a tension acted on the lead wire 109 in the molded portion 111 and the stopper 112.

Accordingly, it is possible to prevent the tension acting on the sheath pin core wire 102, and to sufficiently reduce the tension acted on the sheath pin core wire 102.

In this embodiment, although the molded portion 111 is formed of glass, it is not limited to this structure. That is, the molded portion 111 can be formed by another material such as a ceramic.

(Second Embodiment)

Figure 5:
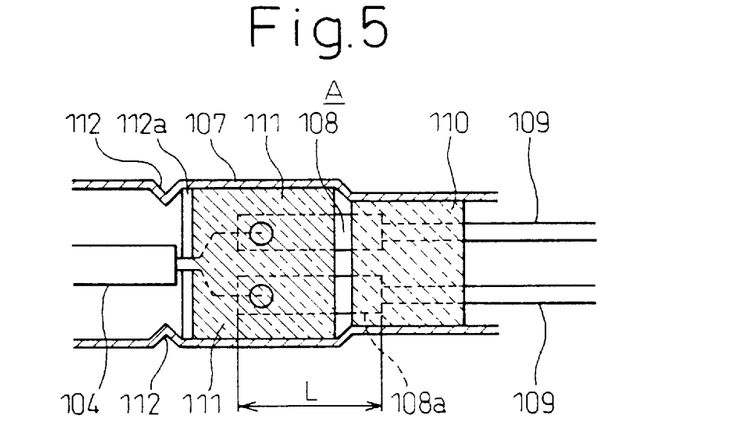
FIG. 5 is an enlarged view of portion A shown in FIG. 1, and used as a second embodiment.

Compared to the temperature sensor 100 of the first embodiment, the durability against the tension acted on the lead wire 109 is strengthened in this embodiment. A concrete structure will be explained below.

FIG. 5 is an enlarged view of portion A shown in FIG. 1, and is used as a second embodiment. The length L of the connector 108 (the size of the part approximately parallel to the longitudinal direction of the protection tube 107) is longer than the connector 108 of the first embodiment, and a part of the connector 108 is projected from the molded portion 111 to the side of the lead wire 109. The projected portion 108a and a part of the lead wire 109 are adhered to the protection tube 107 by using an inorganic adhesive (for example, an alumina in this embodiment).

In this embodiment, the bush made of rubber is eliminated, and the part fixed by the inorganic adhesive is used as the bush 110. Further, in the end portion of the side of the sheath pin 104 of the molded portion 111, the displacement is limited through the ring 112a made of alumina.

Further, in this embodiment, although the alumina is used as the inorganic adhesive, it is not limited to the alumina. For example, it is possible to utilize "HYPER RANDOM" made by Showa Denko Co., Ltd. or "SUMISERAM" made by Asahi Chemical Co., Ltd.

(Third Embodiment)

Figure 6:
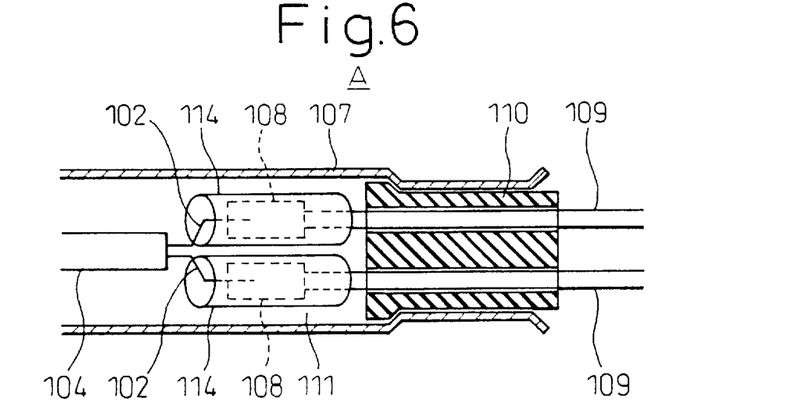
FIG. 6 is an enlarged view of portion A shown in FIG. 1, and used as a third embodiment.

FIG. 6 is an enlarged view of portion A shown in FIG. 1, and used as a third embodiment. In this embodiment, the molded portion is eliminated, and the connection portion A between the sheath pin core wire 102 and the lead wire 109 including the connector 108 is covered by the tube 114 having an electrically insulating characteristic (in this embodiment, Teflon). Further, the tube 114 is fixed to the lead wire 109 by using ultrasonic welding.

At that time, the lead wire 109 is held by the bush 110 as explained in the first embodiment. When tension acts on the lead wire 109, the end of the tube 114 is collided with bush 110, and it is possible to receive the tension acted on the lead wire 109 using the bush 110. Accordingly, it is possible to prevent the tension acting on the sheath pin core wire 102, and to sufficiently reduce the tension acted on the sheath pin core wire 102.

(Fourth Embodiment)

Figure 7A:
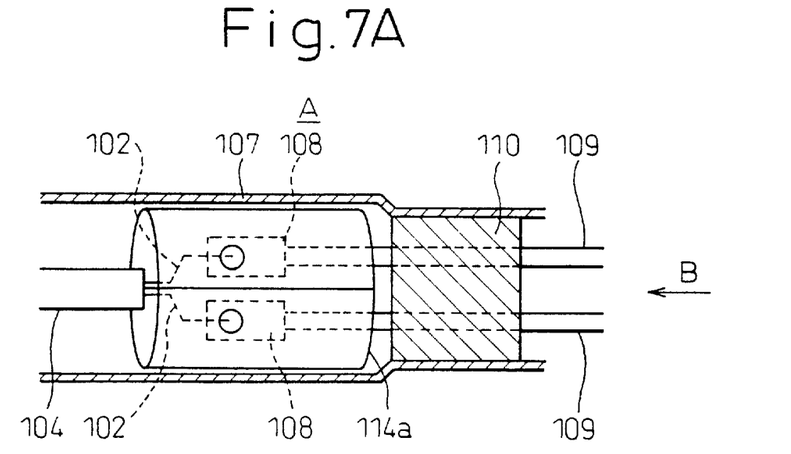
FIG. 7A is an enlarged view of portion A shown in FIG. 1, and used as a fourth embodiment.
Figure 7B:
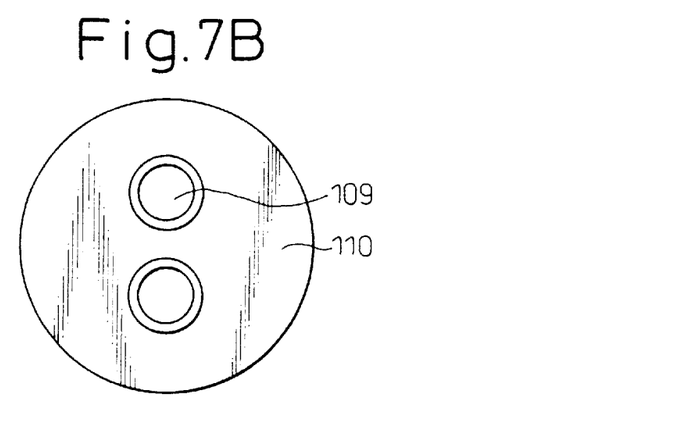
FIG. 7B shows an example of two holes used for the lead wire.
Figure 7C:
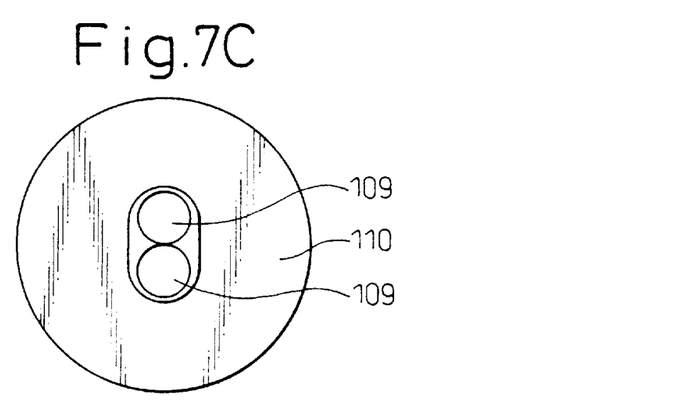
FIG. 7C shows an example of one hole used for the lead wire.

FIG. 7A is an enlarged view of portion A shown in FIG. 1, and is used as a fourth embodiment. As shown in FIG. 7, the bush 110 is made of a metal (aluminum, in this embodiment). Further, the plastic deformation is given to the bush 110 so as to reduce the outer size (cross-sectional area) of the bush 110, and the lead wire 109 is positively held by the bush 110. FIG. 7B shows an example of two holes used for the lead wire 109, and FIG. 7C shows an example of one hole used for the lead wire 109.

According to this structure, compared to the case that the lead wire 109 is held by the bush made of rubber, it is possible to fixedly hold the lead wire 109, using the bush 110, and it is possible to receive the tension acting on the lead wire 109, using the bush 110. Accordingly, it is possible to prevent the tension acting on the sheath pin core wire 102, and to sufficiently reduce the tension acting on the sheath pin core wire 102.

In this case, number 114a is a protection tube formed by an electrically insulating material (an alumina in this embodiment) having superior heat-proof characteristic in order to protect the lead wire 109 (in the vicinity of connector 108) from the exhaust heat.

(Fifth Embodiment)

Figure 8:
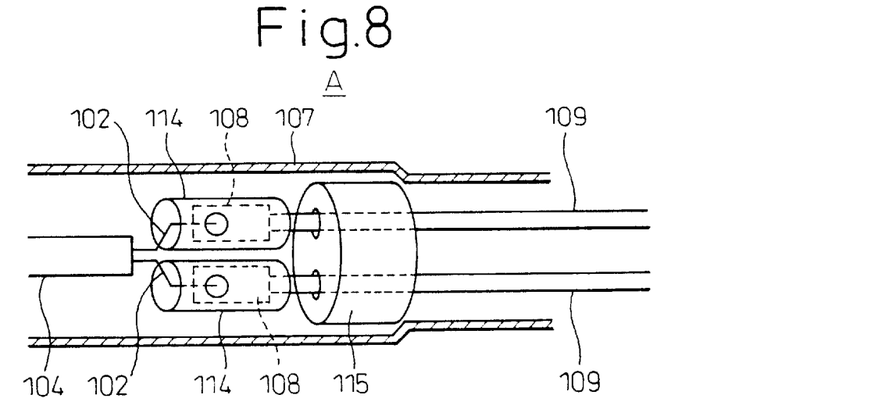
FIGS. 8 and 9 are enlarged views of portion A shown in FIG. 1, and used as a fifth embodiment.
Figure 9:
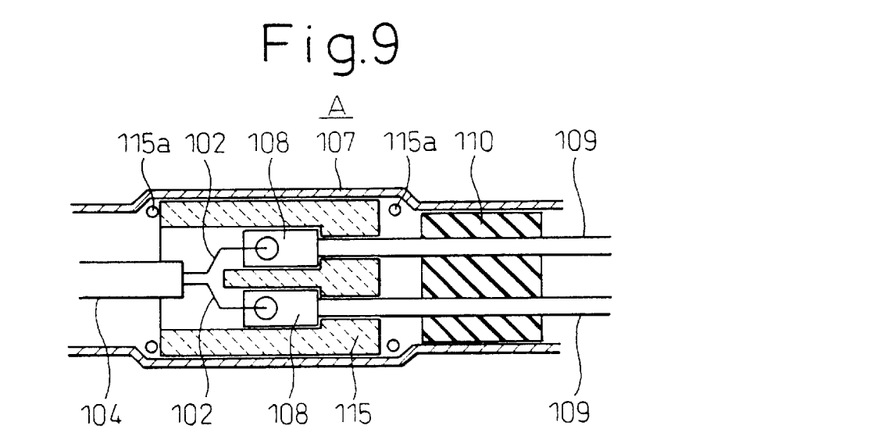

FIGS. 8 and 9 are enlarged views of portion A shown in FIG. 1, and are used as fifth and sixth embodiments. The connector 108 is displaced beyond a predetermined amount in the protection tube 107 due to collision of the connector 108. Accordingly, a stopper 115 is provided for limiting the displacement.

According to this structure, it is possible to receive the tension acting on the lead wire 109 using the connector 108, to prevent the tension acting on the sheath pin core wire 102, and to sufficiently reduce the tension acting on the sheath pin core wire 102.

In the example shown in FIG. 8, the stopper 115 is formed by resin, and the protection tube 107 is pressed so as to reduce the inner size thereof. Accordingly, it is possible to prevent the stopper 115 coming-off from the protection tube 107 due to the tension acting on the lead wire 109. In this case, number 114 is an insulating tube made of Teflon and is provided for preventing contact of the connector 108 with the protection tube 107.

In the example shown in FIG. 9, the stopper 115 is formed by a ceramic material (for example, glass in this embodiment) having an insulating resistance and heat-proof characteristic each exceeding a predetermined value. The stopper 115 is engaged by a packing 115a having ring-like shape and made of alumina. Accordingly, the displacement of the stopper 115 in the protection tube 107 due to the tension acting on the lead wire 109 can be limited.

In the example shown in FIG. 9, although a bush 110 made of rubber is used, it is possible to utilize a talc, which is a kind of clay mineral, as the bush 110.

(Sixth Embodiment)

Figure 10:
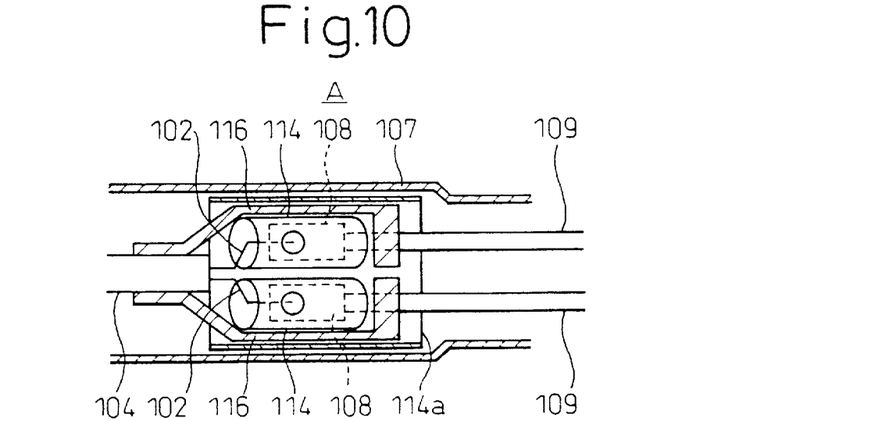
FIG. 10 is an enlarged view of portion A shown in FIG. 1, and used as a sixth embodiment.

FIG. 10 is an enlarged view of portion A shown in FIG. 1, and is used as a sixth embodiment. A bridge member 116 made of metal is provided in which one end is fixed to the lead wire 109, and the other end is fixed to the sheath pin 104.

According to this structure, since the tension acting on the lead wire 109 is not applied to the connector 108 and the sheath pin core wire 102, and can be received by the sheath pin 104, it is possible to sufficiently reduce the tension acting on the sheath pin core wire 102.

(Seventh Embodiment)

Figure 11A:
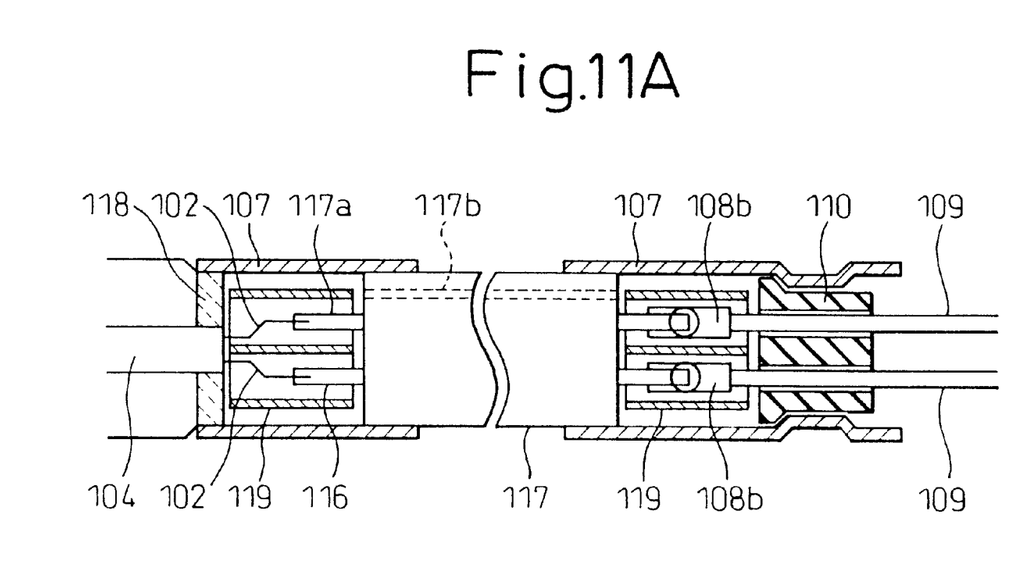
FIG. 11A is an enlarged view of portion A in FIG. 1, and used as a seventh embodiment.
Figure 11B:
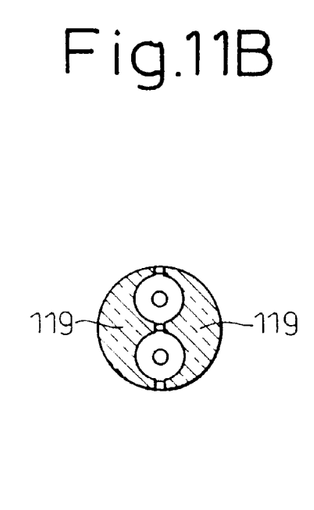
FIG. 11B is a cross-sectional view of an insulating glass portion.

FIG. 11A is an enlarged view of portion A in FIG. 1, and is used as a seventh embodiment. FIG. 11B is a cross-sectional view of an insulating glass portion. In the above embodiments, the sheath pin core wire 102 and the lead wire 109 are directly connected one anther through the connector 108. In this embodiment, as shown in FIG. 11A, a relay sheath pin core wire 117a is provided for electrically connecting between the sheath pin core wire 102 and the lead wire 109. The relay sheath pin core wire 117a is fixedly contained within the relay sheath pin 117 made of metal (for example, a stainless steel in this embodiment) and is cylindrically formed.

In this embodiment, after filling powder (for example, magnesia in this embodiment) having electrically-insulating characteristic within the relay sheath pin 117, the powder is fired and made hard, and the relay sheath pin core wire 117a can be fixed within the relay sheath pin 117.

According to this structure, as it is possible to receive the tension acting on the lead wire 109 using the relay sheath pin core wire 117a and relay sheath pin 117, it is possible to prevent the tension directly acting on the sheath pin core wire 102, and to sufficiently reduce the tension acting on the sheath pin core wire 102.

In this embodiment, the relay sheath pin 117 is welded to the protection tube 107, and serves as a part of the protection tube 107. Further, a vent hole 117b is provided to the relay sheath pin 117 for connecting between side of the sheath pin core wire 102 and side of the lead wire 109 so that it is possible to prevent an extreme rise of the inner pressure in the sheath pin core wire 102.

Number 118 is a packing member made of a metal (for example, aluminum in this embodiment) for fastening the sheath pin 104 to the protection tube 107. The packing member 118 is fastened to the protection tube 107 so as to reduce the outer diameter of the protection tube 107 so that it is possible to hold the sheath pin 104.

Further, the lead wire 109 and the relay sheath pin core wire 117a are electrically connected one another through the metal connector 108b. On the other hand, the relay sheath pin core wire 117a and the sheath pin core wire 102 are electrically and directly connected one another and not through the connector. In this case, the lead wire 109 and the connector 108b are mechanically coupled and fixed to one another by using caulking. On the other hand, the connector 108b and the relay sheath pin core wire 117a are coupled to one another using resistance welding.

In this case, by setting the wire diameter of the relay sheath pin core wire 117a so as to become thicker than the wire diameter of the sheath pin core wire 102, a welding area of the relay sheath pin core wire 117a of the connector 108b is increased exceeding the welding area between the sheath pin core wire 102 and the connector 108.

According to this structure, the relay sheath pin core wire 117a is fixed to the relay sheath pin 117, and it is possible to improve the durability of the temperature sensor 100 against the tension acting on the lead wire 109.

As shown in FIG. 11B, the connection portion between the lead wire 109 and the relay sheath pin core wire 117a and the connection portion between the relay sheath pin core wire 117a and the sheath pin core wire 102, are protected in a structure sandwiched by two insulators 119 formed by an electrically insulating material having superior heat-proof characteristic (for example, alumina in this embodiment). In this case, both insulators 119 are adhered by the inorganic adhesive.

(Eighth Embodiment)

Figure 12:
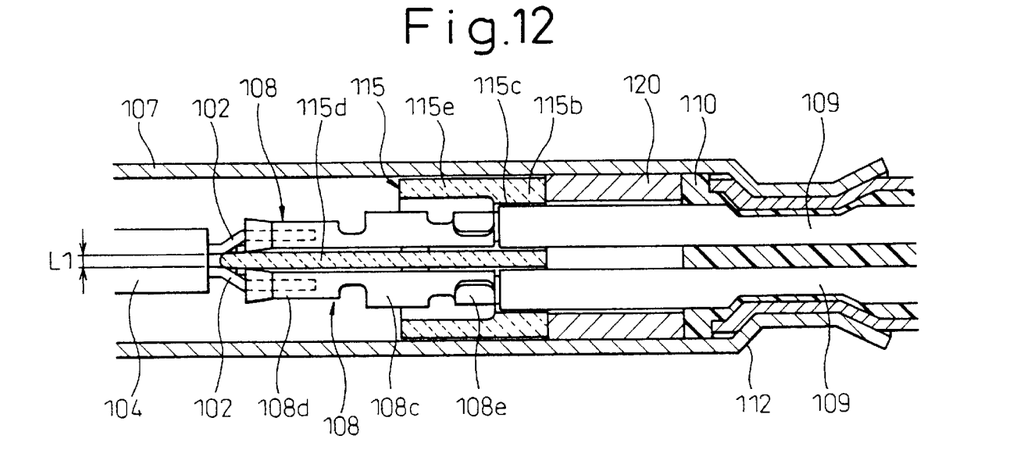
FIG. 12 is an enlarged view of portion A in FIG. 1, and used as a eighth embodiment.
Figure 13A:
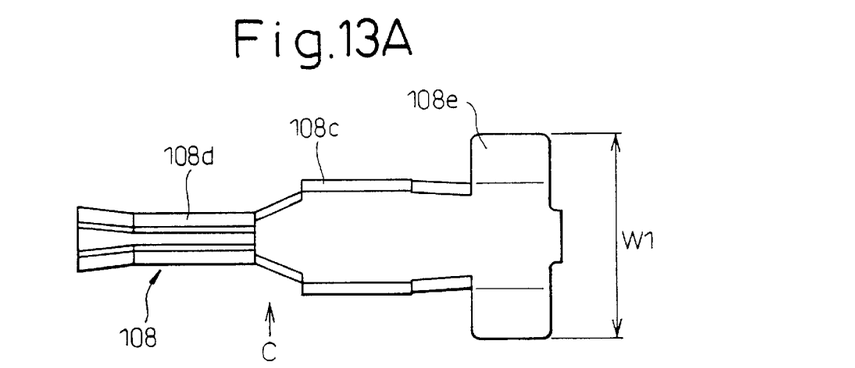
FIG. 13A is a plan view of the connector in FIG. 12.
Figure 13B:
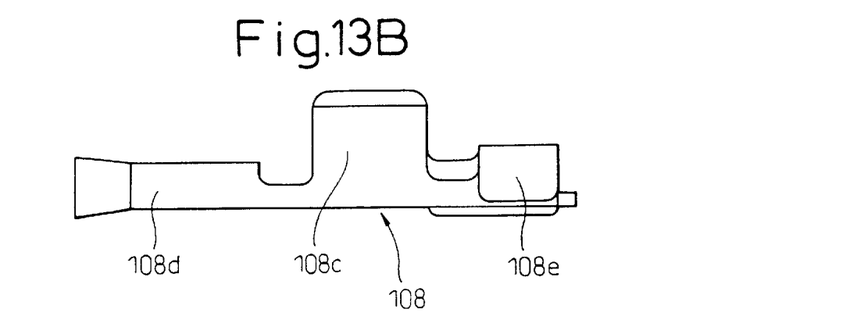
FIG. 13B is a view from an arrow C in FIG. 13A.
Figure 14A:
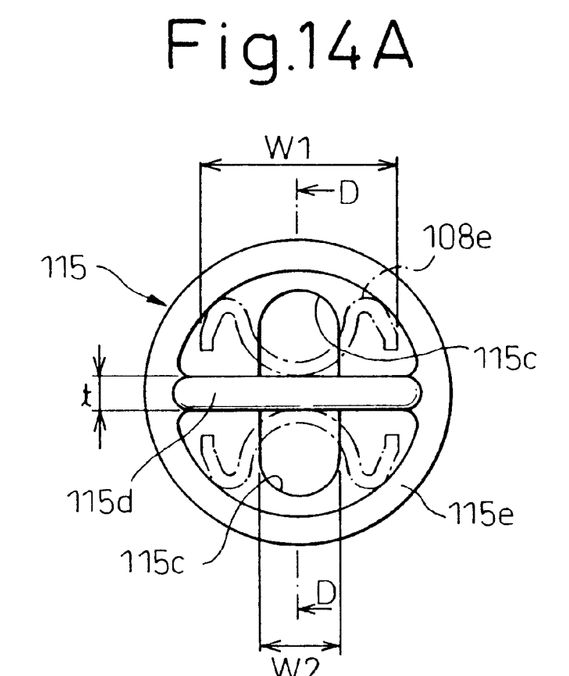
FIG. 14A is a side view indicating a stopper in FIG. 12.
Figure 14B:
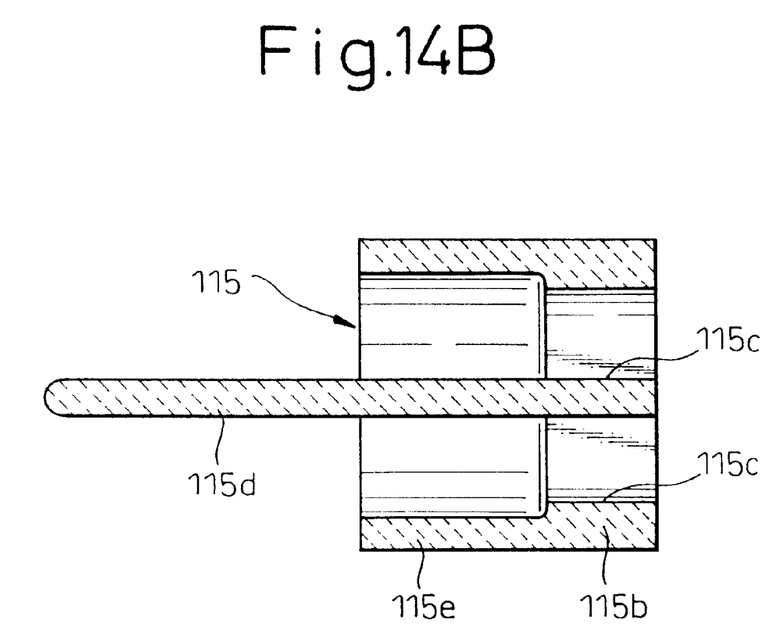
FIG. 14B is a cross-sectional view along with D—D line in FIG. 14A.

FIG. 12 is an enlarged view of portion A in FIG. 1, and is used as a eighth embodiment. FIG. 13A is a plan view of the connector in FIG. 12. FIG. 13B is a view from an arrow C in FIG. 13A. FIG. 14A is a side view for indicating a stopper in FIG. 12. FIG. 14B is a cross-sectional view along with D—D line in FIG. A.

The stopper 115 is provided to prevent the displacement of the connector 108 exceeding a predetermined amount in the protection tube 107 upon collision of the connector 108. This structure is common to the fifth embodiment (FIGS. 8 and 9).

In FIG. 12, a spacer 120 having a cylindrical shape and made of a metal (for example, stainless steel, carbon steel) is provided between the stopper 115 and the bush 110. The lead wire 109 is inserted into the spacer 120. Further, the spacer 120 is fixedly held in a predetermined position of the protection tube 107 by calking the protection tube 107 so as to reduce the diameter.

As shown in FIG. 13, the connector 108 has a lead wire calking portion 108c in which the lead wire 109 is fixedly calked in the longitudinal and intermediate portion. Further, the connector 108 has a core connection portion 108d to which the sheath pin core wire 102 is connected using laser welding, at one end in the longitudinal direction. Further, the connector 108 has a nail-like portion 108e expanded to the outer diameter, in the other end of the longitudinal direction. In FIG. 14A, the nail-like portion 108e is shown by a chain-dotted line.

The stopper 115 is formed of a ceramic (for example, alumina in this embodiment) having an insulating resistance exceeding a predetermined value and heat-proof characteristic. As shown in FIG. 14, two penetrating holes 115c is formed in the bottom 115b of the stopper 115 in order to insert the lead wire 109. A plate-like partition 115d is formed so as to elongate from the bottom 115b to the side of the sheath pin 104, and inserted between two connectors 108. Further, a cylindrical portion 115e is formed so as to elongate from the bottom 115b to the side of the sheath pin 104, and covers the connector 108.

The cylindrical portion 115e covers the portions of the connector 108 except for the core wire connecting portion 108d. In detail, the cylindrical portion 115e covers the nail-like portion 108e and a part of the lead wire calking portion 108c. Further, the width W1 of the nail-like portion 108e of the connector 108 is set so as to be larger than the width W2 of the penetrating hole 115c of the stopper 115.

Further, a thickness of the partition 115d of the stopper 115 is set so as to become larger than the distance L1 between two connectors 108, in the projected portion from the sheath pin 104. Further, the head of the partition 115d is contacted with two connectors 108, and the bottom 115b is contacted with the spacer 120. Accordingly, the stopper 115 can be fixed.

According to this embodiment, when the tension acts on the lead wire 109 so that the connector 108 is pulled, the nail-like portion 108e of the connector 108 is contacted with the bottom portion 115b of the stopper 115, and the bottom 115b of the stopper 115 is contacted with the spacer 120. Accordingly, it is possible to receive the tension acting on the lead wire 109 in the connector 108. As a result, it is possible to prevent the tension acting on the sheath pin core wire 102, and to sufficiently reduce the tension acting on the sheath pin core wire 102.

Further, the cylindrical portion 115e of the stopper 115 is shorter than the connector 108, and the core connection portion 108d of the connector 108 is not covered by the cylindrical portion 115e. Accordingly, it is possible to easily perform the connection work between the connector 108 and the sheath pin core wire 102.

(Ninth Embodiment)

Figure 15:
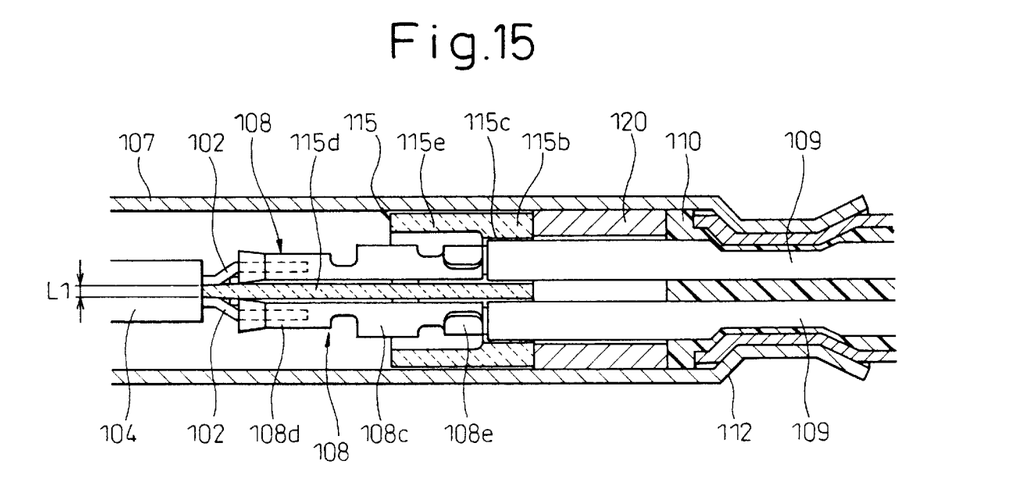
FIG. 15 is an enlarged view of portion A in FIG. 1, and used as a ninth embodiment.

FIG. 15 is an enlarged view of portion A in FIG. 1, and is used as a ninth embodiment. The head of the partition 115d of the stopper 115 is contacted with two connectors 108 in the eighth embodiment. As shown in FIG. 15, in this embodiment, the thickness of the head of the partition 115d is smaller than the distance L1 between the connectors 108, and the head of the partition 115d is contacted with the end surface of the sheath pin 104.

According to this structure, the stopper 115 is fixed by the sheath pin 104 and the spacer 120 so that it is possible to fixedly hold the stopper 115.

(Tenth Embodiment)

Figure 16:
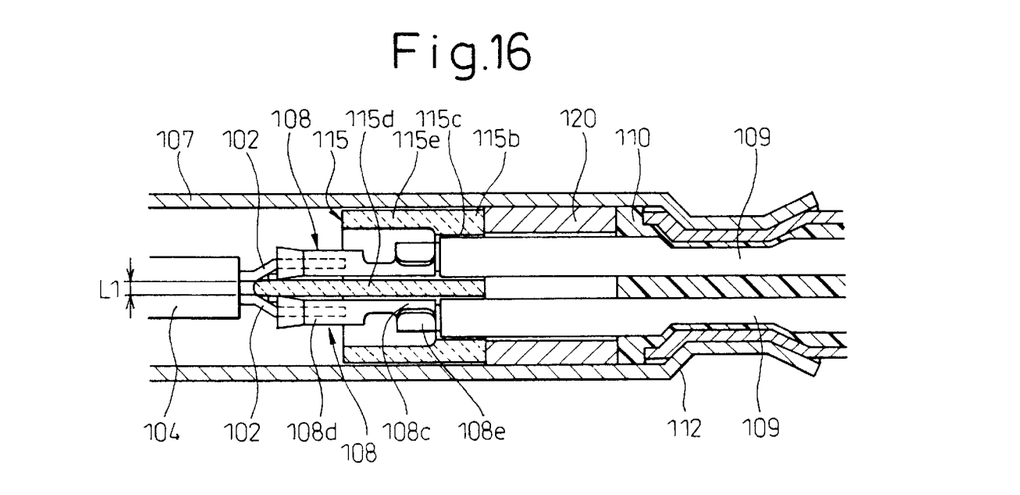
FIG. 16 is an enlarged view of portion A in FIG. 1, and used as a tenth embodiment.

FIG. 16 is an enlarged view of portion A in FIG. 1, and is used as a tenth embodiment. In this embodiment, the lead wire calking portion 108c of the connector 108 of the eighth embodiment is integrated with the nail-like portion 108e. Concretely, as shown in FIG. 16, the lead wire calking portion 108c is formed at one end, in the longitudinal direction, of the connector 108, and the nail-like portion 108e is defined as the portion elongated to the outer diameter from the lead wire calking portion 108c. According to this structure, it is possible to reduce the length, in the axis direction, of the connector 108 and the stopper 115.

(Eleventh Embodiment)

Figure 17:
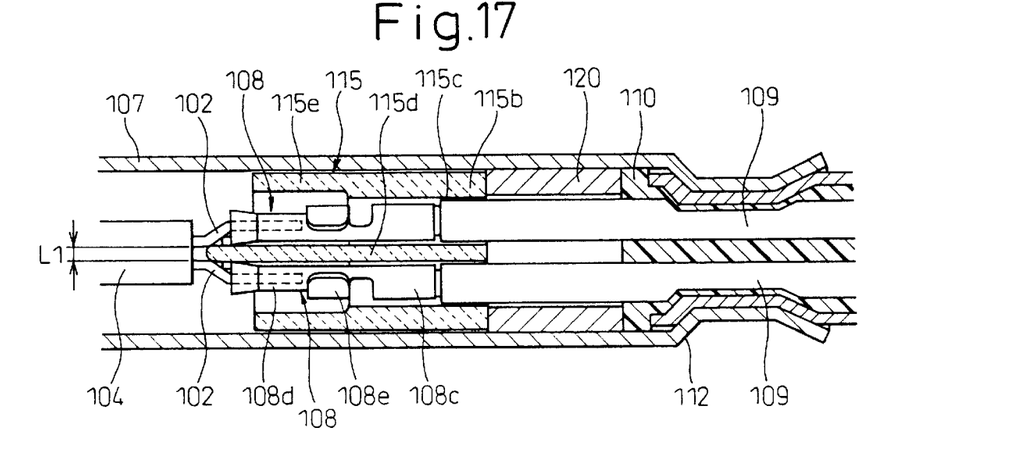
FIG. 17 is an enlarged view of portion A in FIG. 1, and used as an eleventh embodiment.

FIG. 17 is an enlarged view of portion A in FIG. 1, and is used as an eleventh embodiment. In this embodiment, the core wire connection portion 108d of the connector 108 of the eighth embodiment is integrated with the nail-like portion 108e. Concretely, as shown in FIG. 17, the lead wire calking portion 108c is formed in one end of the longitudinal direction of the connector 108, the core wire connecting portion 108d is formed in the other hand of the longitudinal direction of the connector 108, and the portion elongated from core wire connecting portion 108d to the outer diameter is defined as the nail-like portion 108e. According to this structure, it is possible to reduce the length, in the axis direction, of the connector 108.

(Twelfth Embodiment)

Figure 18:
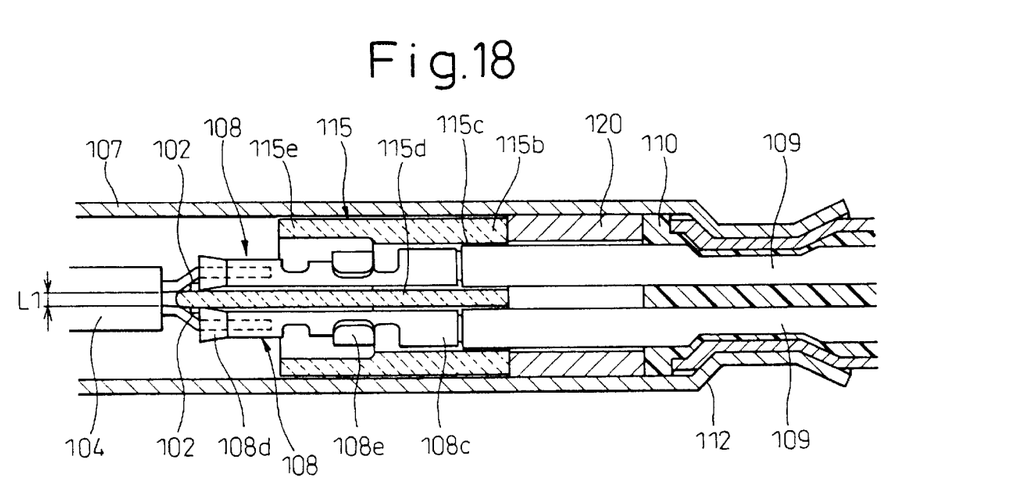
FIG. 18 is an enlarged view of portion A in FIG. 1, and used as a twelfth embodiment.

FIG. 18 is an enlarged view of portion A in FIG. 1, and is used as a twelfth embodiment. In this embodiment, the arrangement of the lead wire calking portion 108c of the connector 108, the core wire connecting portion 108d, and the nail-like portion 108e, these being the eighth embodiment, is changed. Concretely, as shown in FIG. 18, the lead wire calking portion 108c is formed in one end of the longitudinal direction of the connector 108, the core wire connecting portion 108d is formed in the other end of the longitudinal direction, and the nail-like portion 108e is formed in the intermediate portion of the longitudinal direction.

(Thirteenth Embodiment)

Figure 19:
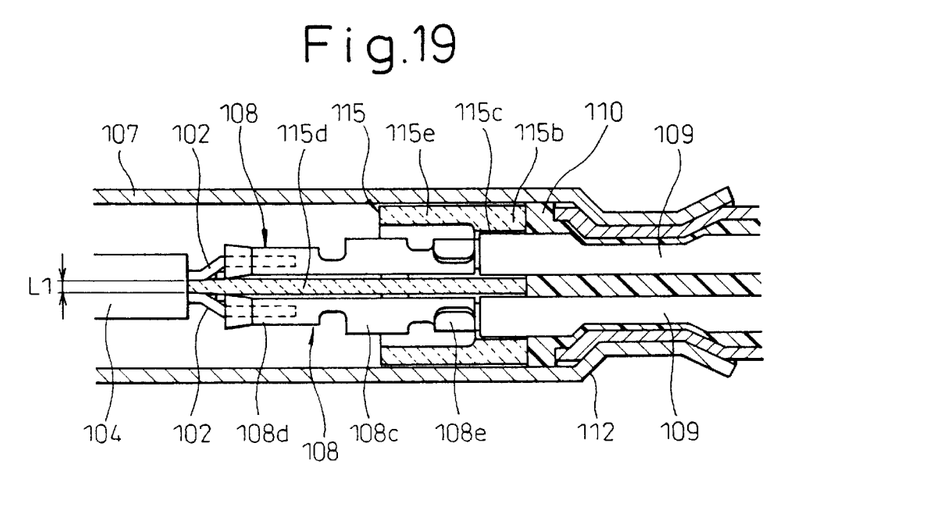
FIG. 19 is an enlarged view of portion A in FIG. 1, and used as a thirteenth embodiment.

FIG. 19 is an enlarged view of portion A in FIG. 1, and is used as a thirteenth embodiment. In this embodiment, the space 120 of the ninth embodiment is eliminated. Concretely, as shown in FIG. 19, the bottom 115b of the stopper 115 is contacted with the bush 110, and the head of the partition 115b of the stopper 115 is contacted with the end surface of the sheath pin 104 so that the stopper 115 can be fixed.

According to this embodiment, when tension acts on the lead wire 109 so that the connector 108 is pulled, the nail-like portion 108e of the connector 108 is contacted with the bottom 115b of the stopper 115, and the bottom 115b of the stopper 115 is contacted with the bush 110. Accordingly, since it is possible to receive the tension acting on the lead wire 109 in the connector 108, it is possible to prevent the tension acting on the sheath pin core wire 102, and to sufficiently reduce the tension acting on the sheath pin core wire 102. Further, it is possible to reduce the number of parts, and the assembly time in the manufacturing processes, by eliminating the spacer 120.

(Fourteenth Embodiment)

Figure 20:
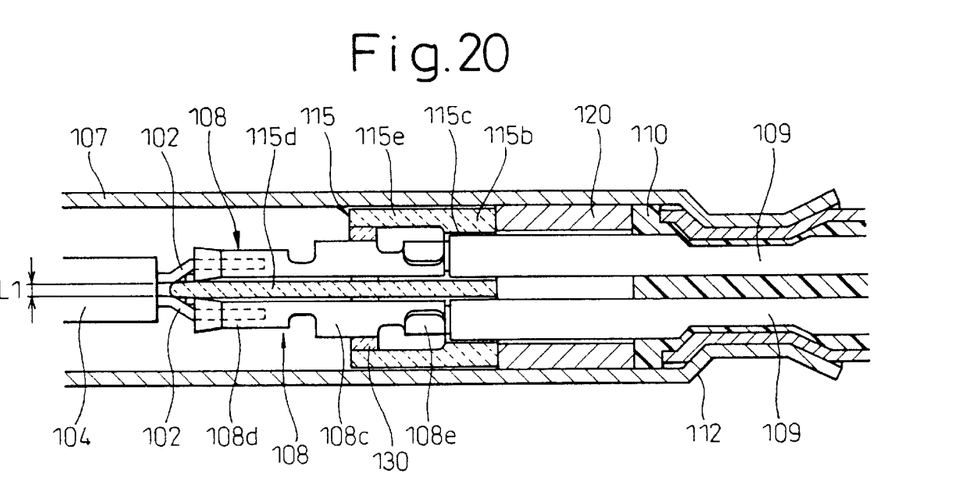
FIG. 20 is an enlarged view of portion A in FIG. 1, and used as a fourteenth embodiment.

FIG. 20 is an enlarged view of portion A in FIG. 1, and is used as a fourteenth embodiment. In this embodiment, a molded portion 130 is provided between the stopper 115 and the connector 108 for integrating these parts. Concretely, as shown in FIG. 20, the molding material (for example, an adhesive or a ceramic) having an heat-proof characteristic and having a predetermined temperature is injected between the cylindrical portion 115c of the stopper 115 and the lead wire calking portion 108c of the connector 108, and the molding material is hardened and a molded portion 130 can be provided.

According to this structure, by providing the molded portion 130, the position of the diameter direction of the connector 108 is fixed so that it is possible to surely prevent contact between the connector 108 and the protection tube 107. Further, since twisting of the connector 108 due to vibration can be suppressed by the molded portion 130, it is possible to sufficiently reduce action of the tension on the sheath pin core wire 102

(Other Embodiments)

In the above embodiments, the explanations are given to the various mounting structures of the exhaust temperature sensor. However, it is possible to apply the invention to other structures within the scope of the invention.

What is claimed is:

1. A temperature sensor comprising:

a sensor body for sensing a temperature;

a sheath pin core wire electrically connected to the sensor body;

a connector electrically connecting between the sheath pin core wire and a lead wire; and a protection tube for containing the connector and the sheath pin core wire, and for protecting the connector and the sheath pin core wire;

wherein a connection portion between the sheath pin core wire and the lead wire, including the connector, is hardened by a ceramic material so that a molded portion is provided; and wherein a displacement limiting means is provided for limiting a displacement of the molded portion, exceeding a predetermined value, in the protection tube.

2. A temperature sensor as claimed in claim 1, wherein a portion projected to a side of the lead wire from the molded portion in the connector and a part of the lead wire are adhered using an inorganic adhesive.

3. A temperature sensor comprising:

a sensor body for sensing a temperature;

a sheath pin core wire electrically connected to the sensor body;

a connector electrically connecting between the sheath pin core wire and a lead wire;

a protection tube for containing the connector and the sheath pin core wire, and for protecting the connector and the sheath pin core wire; and a bush for holding and fastening the lead wire to the protection tube by holding the lead wire;

wherein a connection portion between the sheath pin core wire and the lead wire, including the connector, is covered by a tube, and the tube is fixed directly to the lead wire.

4. A temperature sensor as in claim 3, wherein the tube is fixed to the lead wire using ultrasonic welding.

5. A temperature sensor comprising:

a sensor body for sensing a temperature;

a sheath pin core wire electrically connected to the sensor body;

a cylindrical sheath pin for covering the sheath pin core wire;

a connector electrically connecting between the sheath pin core wire and a lead wire; and a protection tube for containing the connector and the sheath pin core wire, and for protecting the connector and the sheath pin core wire;

wherein a bridge member is provided, one end of the bridge member is fixed to the lead wire, and the other end of the bridge member is fixed directly to the sheath pin.

6. A temperature sensor as in claim 5, wherein said bridge member made of metal.

7. A temperature sensor comprising:

a sensor body for sensing a temperature;

a sheath pin core wire electrically connected to the sensor body;

a cylindrical sheath pin for covering the sheath pin core wire;

a relay sheath pin core wire electrically connecting between the sheath pin core wire and a lead wire; and a cylindrical sheath pin for containing the relay sheath pin core wire, wherein the relay sheath pin core wire is fixedly attached to the cylindrical sheath pin.

8. A temperature sensor as claimed in claim 7, wherein the relay sheath pin core wire is fixed in the relay sheath pin by filling powder having electrically insulating characteristic within the relay sheath pin.

9. A temperature sensor as claimed in claim 8, wherein a diameter of the wire of the relay sheath pin core wire is greater than a diameter of the sheath pin core wire.

10. A temperature sensor as claimed in claim 7, wherein a diameter of the wire of the relay sheath pin core wire is thicker than the diameter of the wire of the sheath pin core wire.

11. A temperature sensor comprising:

a sensor body for sensing a temperature;

a sheath pin core wire electrically connected to the sensor body;

a metal connector for electrically connecting between the sheath pin core wire and a lead wire and having a connecting portion with the sheath pin core wire; and a protection tube for containing the connector and the sheath pin core wire, and for protecting the connector and the sheath pin core wire;

wherein a stopper is provided for limiting displacement of the connector exceeding a predetermined displacement value due to collision of the connector within the protection tube, the stopper includes a cylindrical portion for covering portions of the connector except for the connecting portion of the sheath pin core wire.

12. A temperature sensor as claimed in claim 11, wherein the connector has a lead wire calking portion in which the lead wire is fixedly calked and the core connection portion to which the sheath pin core wire is connected.

13. A temperature sensor as in claim 11, wherein the stopper is formed of a ceramic material having an insulating resistance and heat proof characteristic, each exceeding a predetermined value.

14. A temperature sensor comprising:

a sensor body for sensing a temperature;

a sheath pin core wire electrically connected to the sensor body;

a metal connector electrically connecting between the sheath pin core wire and a lead wire;

a protection tube for containing the connector and the sheath pin core wire, and for protecting the connector and the sheath pin core wire; and a bush for holding and fastening the lead wire to the protection tube by holding the lead wire;

wherein a stopper is provided for limiting a displacement of the connector exceeding a predetermined displacement value due to collision of the connector therewith within the protection tube, wherein the stopper is formed of a ceramic material having an insulating resistance and heat proof characteristic, each exceeding a predetermined value.

15. A temperature sensor comprising:

a sensor body for sensing a temperature;

a sheath pin core wire electrically connected to the sensor body;

a metal connector electrically connecting between the sheath pin core wire and a lead wire;

a protection tube for containing the connector and the sheath pin core wire, and for protecting the connector and the sheath pin core wire; and a bush for holding and fastening the lead wire to the protection tube by holding the lead wire;

wherein a stopper is provided for limiting a displacement of the connector exceeding a predetermined displacement value due to collision of the connector therewith within the protection tube, wherein said stopper engages a ring shaped packing to limit displacement of the stopper in said protection tube.

16. A temperature sensor as in claim 15, wherein said packing is made of alumina.

* * * * *